United States Patent
Wellbrock

[19]

[11] Patent Number: 6,078,596
[45] Date of Patent: Jun. 20, 2000

[54] METHOD AND SYSTEM OF SONET LINE TRACE

[75] Inventor: Glenn Wellbrock, Wylie, Tex.

[73] Assignee: MCI Communications Corporation, Washington, D.C.

[21] Appl. No.: 08/883,548

[22] Filed: Jun. 26, 1997

[51] Int. Cl.[7] .................................................. H04L 12/57
[52] U.S. Cl. ...................... 370/907; 370/244; 370/248; 370/249; 370/389
[58] Field of Search ..................................... 370/230, 231, 370/389, 392, 907, 244, 248, 249, 250, 252; 714/712

[56] References Cited

U.S. PATENT DOCUMENTS

| | | | |
|---|---|---|---|
| 5,570,371 | 10/1996 | Iga | 370/907 |
| 5,572,515 | 11/1996 | Williamson et al. | 370/907 |
| 5,768,255 | 6/1998 | Brownmiller et al. | 370/907 |
| 5,872,780 | 2/1999 | Demiray et al. | 370/907 |
| 5,923,653 | 7/1999 | Denton | 370/907 |

*Primary Examiner*—Chi H. Pham
*Assistant Examiner*—Frank Duong

[57] ABSTRACT

The present invention generally relates to a network and method capable confirming proper communications of high data rate optical signals between communications network devices. In particular, the present invention teaches a method of creating a "Line Trace" byte to be placed in the Line Overhead portion of the Transport Overhead of a SONET STS-1 frame optical data signal. Current Line Overhead does not incorporate any Trace functionality. With the increasing use of optical cross-connect switches within a communications network, it is essential for a network service provider to have the flexibility to move Line Terminating Equipment around via the optical switches. Thus, the present invention offers a straightforward, efficient way to achieve this necessary flexibility.

11 Claims, 4 Drawing Sheets

METHOD AND SYSTEM OF SONET LINE TRACE

BACKGROUND OF THE INVENTION

1. Field of the Invention

This invention relates generally to confirming proper communications within a network. In particular, this invention relates to creating a Line Trace byte to be placed in the Line Overhead portion of the Transport Overhead of a SONET STS-1 frame.

2. Related Art

A communication network serves to transport information among a number of locations. The information is usually presented to the network in the form of time-domain electrical signals and may represent any combination of telephony, video, or computer data in a variety of formats. A typical communication network consists of various physical sites, called nodes, interconnected by information conduits, called "links." Each link serves to carry information from one site to another site. Individual sites contain equipment for combining, separating, transforming, conditioning, and/or routing data.

Optical networks, in turn, typically include a plurality of fiber optic transmission lines or links permitting high bandwidth data communications used in telephone and other data network systems. High speed data can be modulated on light waves which are transmitted by optical sources (such as semiconductor diode lasers) through the optical network. The optical transmission line, connecting an optical transmitter and receiver, can propagate many light wave signals of different frequencies simultaneously.

These fiber optic communications links carry vast amounts of information among distant sites to accomplish data, voice and image connectivity over a large geographical area. Optical transmission lines, transmitters and receivers, however, are prone to failure. The failure of such links can have a substantial economic and practical impact on network users and network service providers. Therefore, in designing communications networks, special measures are practiced to assure utmost reliability of network components and survivability in the event of link failure due to physical fiber damage or optical component failure. Consequently, restoration techniques have been devised to circumvent a network link failure and to quickly restore normal traffic flow.

Today, the typical method of transporting optical data along an optical fiber network is through the use of a digital hierarchy called SONET. For a comprehensive summary of the state of the art concerning SONET, the reader is referred to "Telecommunications Technology Handbook," by Daniel Minoli, Artech House, Inc. (1991), which is incorporated by reference herein. In particular, Chapter 3.8 specifically addresses SONET signal applications. However, a brief description is provided here for the reader's convenience.

In order to provide for the transporting of large cross-sections of traffic, SONET establishes a set of network interface standards aimed at enabling global network interconnection. Additionally, SONET defines a multiplexing hierarchy ensuring equipment compatibility between different manufacturers. SONET handles fiber-based signals and allows for the extraction of low rate signals. In particular, SONET defines a hierarchy of rates and formats to be used by vendors, network service providers (or carriers), and end-users for optical transmission at and above the 51.840 Mb/s rate. The data comprises an electrical form of an 810-byte frame transmitted every 125 us to form the 51.840 Mb/s signal (also known as synchronous transport signal-level 1 or STS-1). At this rate, each of the constituent 8-bit bytes is equivalent to a 64 kb/s channel. For transmission over fiber spans, the optical counterpart of the STS-1 signal is called the optical carrier-level 1 signal (OC-1). For both of these signals, the last digit, 1, represents an associated byte-interleaved multiplex structure that creates a group of standard rates at N-times the STS-1 or OC-1 rate. For example, a data signal can be a STS-48 synchronous data signal bearing digital data at about 2.5 Gbps or the equivalent of 32 thousand telephone-quality voice channels.

Presently, optical networks carry high-data rate traffic supporting an ever-increasing variety and range of interconnected data networks, lower-level networks, distributed systems, consumer communication products and services, and remote units. As the proliferation and diversity of network elements and signals becomes greater, network management becomes even more critical. What is needed is a method to insure that SONET optical data signals are routed correctly through the network in order to avoid mis-connections and loss of service continuity.

SUMMARY OF THE INVENTION

The present invention generally relates to a network and method directed toward confirming proper communications of high data rate optical signals between communications network devices. In particular, the present invention teaches a method of creating a "Line Trace" byte to be placed in the Line Overhead portion of the Transport Overhead of a SONET STS-1 frame optical data signal.

A preferred embodiment of the present invention is an optical communications network, wherein data is communicated between a first site and a second site. The network comprises a first Path Terminating Equipment device ($PTE_1$) located at the first site and a second Path Terminating Equipment device ($PTE_2$) located at the second site. These sites are linked by a plurality of optical fibers. In addition, the network also comprises a first Line Terminating Equipment ($LTE_1$) in communication with the first site, capable of transmitting a SONET optical data signal. This SONET signal comprises a Line Trace byte, that is located in a Line Overhead component of the SONET signal (preferably any undefined portion of the Line Overhead). The second site comprises a second Line Terminating Equipment ($LTE_2$) capable of receiving the SONET signal, wherein $LTE_2$ is also capable of acknowledging the Line Trace byte. The network further comprises a plurality of Section Terminating Equipment (STE), located along the transmission fibers between the first and second sites, wherein the STE includes at least one optical cross-connect switch (OCCS). A network management system coupled to $LTE_1$, $LTE_2$, and the Section Terminating Equipment, monitors and controls communications in the network. In addition, the network management system is capable of restoring proper communication between $LTE_1$ and $LTE_2$ if communications fail, wherein the Line Trace byte alerts the LTEs and the network management system if proper communication between $LTE_1$ and $LTE_2$ is not restored.

Additionally, the network further comprises software means for programming the Line Trace byte into the Line Overhead of the SONET signal at $LTE_1$ and for programming $LTE_2$ to acknowledge the Line Trace byte on the SONET signal transmitted by $LTE_1$, wherein the network management system monitors the presence of the Line Trace byte in the SONET signal.

According to another embodiment, the present invention is a method of ensuring proper communications between two sites in the communications network described above. This method comprises the steps of: (1) generating at $LTE_1$ a SONET optical data signal comprising a Line Trace byte embedded in a Line Overhead component of said SONET optical data signal at $LTE_1$; (2) transmitting the SONET optical data signal along a first optical transmission line; (3) receiving the SONET optical data signal at $LTE_2$; wherein $LTE_2$ is capable of detecting the Line Trace byte; (4) acknowledging the presence of the Line Trace byte in the SONET optical data signal received at $LTE_2$; and (5) alerting a network management system if the proper Line Trace byte is not received at $LTE_2$. In a preferred embodiment of the present invention, the step of programming the Line Trace byte onto the Line Overhead component of said SONET optical data signal at the first site is by software means, wherein the Line Trace byte may be located in any undefined portion of the Line Overhead of the SONET signal.

According to another embodiment of the present invention, where the communications network further includes at least one optical cross-connect switch (OCCS) located between the first site and the second site, the method further comprises the steps of (6) determining if the first optical transmission line connecting the first site with the second site has failed, and (7) re-routing signals from the optical transmission line through the OCCS to a second optical transmission line, wherein optical communication between $LTE_1$ and $LTE_2$ is restored if the Line Trace byte is acknowledged by $LTE_2$.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

1. Overview and Discussion of the Invention

The present invention is directed toward confirming proper communications within a network by creating a "Line Trace" byte to be placed in the Line Overhead portion of the Transport Overhead of a SONET STS-1 frame.

Current SONET standards support both Section and Trace functionality which are used to insure that two given section terminating equipment (STE) types and/or two given path terminating equipment (PTE) types are not mis-connected without notification. According to the invention, "Line Trace" would provide this same functionality to all line terminating equipment (LTE) types which currently have no way to insure that they are not mis-connected. This functionality will become critical when LTE equipment is rerouted automatically by independent OCCS equipment. The manner in which this is accomplished is described in detail below.

2. Example Environment

Before describing the invention in great detail, it is useful to describe an example environment in which the invention can be implemented. In the broadest sense, the invention can be implemented in any optical communications network. In particular, one such environment is an optical communications network utilizing SONET protocol to transfer data electrically and optically along the network.

Figure 1:
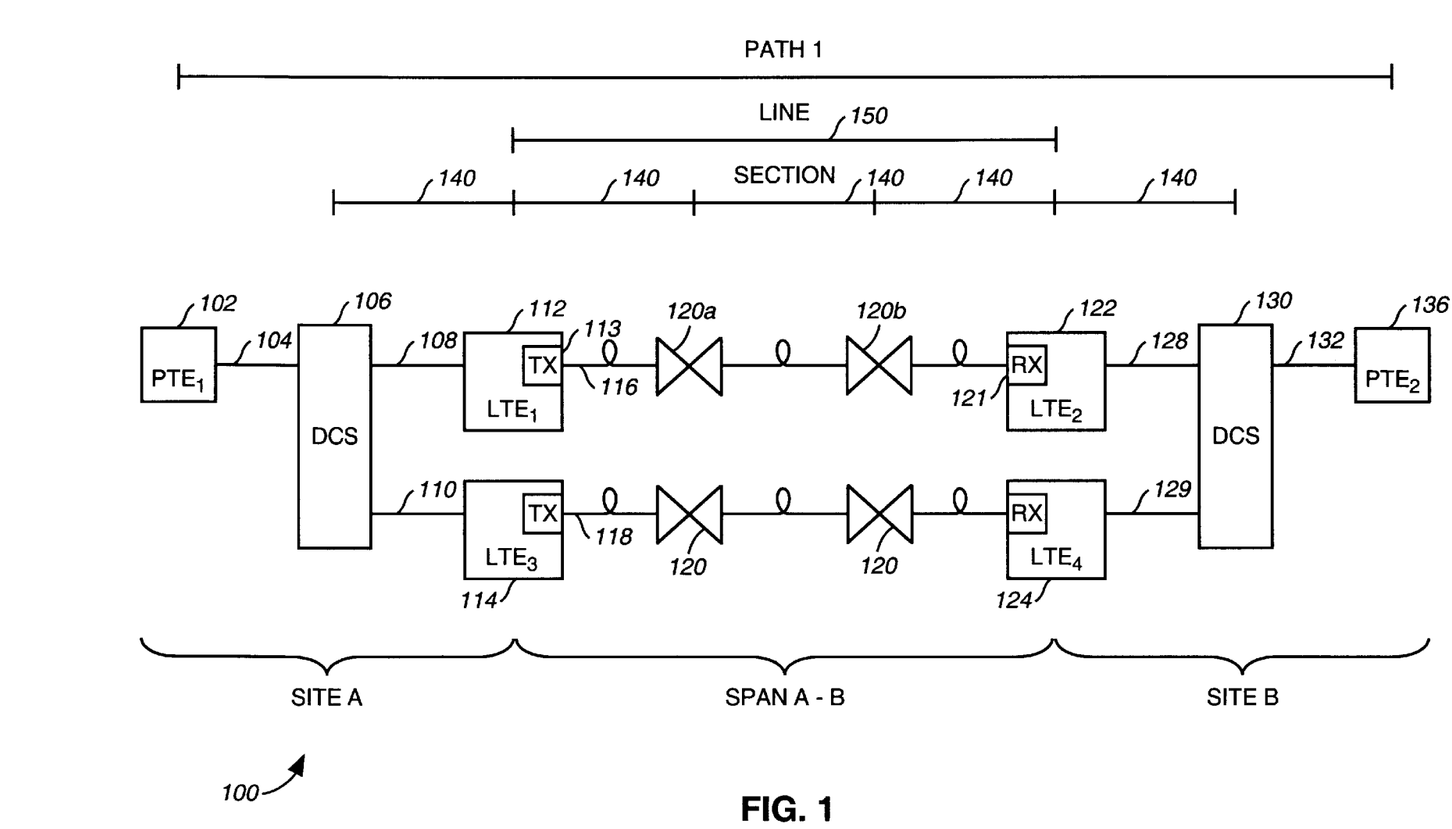
FIG. 1 is a block diagram of the electrical and optical components employed in an optical data communications span.

A simple illustration of a high data rate optical span for transporting an OC-N signal is depicted in FIG. 1. In FIG. 1, a given site A is connected to another site B by a span consisting of two optical fibers 116 and 118. An electrical data signal (STS-N) is presented at Site A by $PTE_1$ 102 via input 104. PTE, or Path Terminating Equipment, typically consists of end-user devices such as telephones or computer workstations connected over a network. After inputting the data at the end-user site, this signal is carried through the network span and recovered at Site B, where $PTE_2$ 136 ultimately receives the data signal via electrical signal output 132.

At Site A, a signal enters a digital cross-connect switch (DCS)106, and under normal conditions appear as an electrical signal along connection 108. The signal at connection 108 enters an optical Lightwave or Line Terminating Equipment (LTE) 112 shown to include an optical transmitter 113, such as a semiconductor laser. Light emitted by the transmitter 113 is intensity-modulated by the electrical data signal that enters along connection 108 to deliver a modulated optical output signal, such as an OC-N signal, over optical fiber 116.

As the signal traverses the length of fiber 116, the signal may be boosted by one or more lightwave regenerators (LREs) 120 located along fiber 116. These lightwave regenerators 120 are also referred to as Section Terminating Equipment (STE). The lightwave regenerators 120 intensify the lightwave signal and compensate for losses introduced by the fibers.

After traversing the length of fiber 116, the optical signal arrives at Site B and enters a receiver 121 such as a photodiode. The receiver 121 is shown to be a part of an $LTE_2$ 122 that amplifies and conditions the signal to render a faithful electrical reproduction at output port 128 of the original electrical data signal provided at input 104. Under normal circumstances, digital cross-connect switch (DCS) 130 simply connects port 128 to output port 132 to complete the end-to-end connection of input 104 to output 132.

In these types of network implementations, the spans linking various network equipment are identified by the types of equipment they link up. For example, the link connecting lightwave regenerators 120a and 120b is called a section 140. Numerous other sections are also identified in FIG. 1. The span linking $LTE_1$ and $LTE_2$ is referred to as a line 150. Similarly, the span linking $PTE_1$ and $PTE_2$ is referred to as a path 160. Thus, in the network environment, line 116 is an example of a dedicated link between two LTEs. Additionally, in a network utilizing SONET hierarchy, all terminating equipment should be SONET compatible.

In FIG. 1, fiber 116 is referred to as a working fiber because it carries data traffic when all network elements are functioning properly. In contrast, fiber 118 is referred to as a spare or "protect" fiber because it carries data traffic only in the event of failure of working fiber 116 or of the associated LTEs 112 and 122. Under normal circumstances, protect fiber 118 does not carry an optical data signal.

When a failure occurs along a working fiber 116, digital cross-connect switches 106 and 130 switch data traffic onto the protect fiber 118. For example, if fiber 116 becomes too damaged to transmit light, switch 106 connects input 104 to connection 110. At the same time, DCS 130 disconnects connection 128 and connects output port 132 to connection 129. This switching action restores end-to-end connectivity between input 104 and output 132 despite the failure of working fiber 116. For a more complete description of restoration techniques, the reader is referred to a commonly owned pending application, "Method and System for Detecting Lint Failure in All Optical Communication Network," Ser. No. 08/582,845, by John A. Fee, filed on Dec. 29, 1995, and incorporated herein by reference.

The ability to restore network service depends upon the ability to detect and locate failed network components. Faults have been detected in the electrical domain at LTEs. A transmitter 113 can detect a failed laser diode, for example, by monitoring its bias current. Some transmitters also incorporate a backwave detector (e.g. photodiode) that picks up the light emerging from the back of the laser diode and can therefore detect the loss of laser output.

For example, a laser diode failure within transmitter 113 can cause $LTE_1$ 112 to report an alarm condition to a network management system (not shown). The system could then direct switching of signals from port 108 to port 110. In addition, DCS 130 would be directed to connect port 129 to output port 132.

Since a receiver 121 can detect the presence of light delivered through fiber 116, a breakage of fiber 116 or failure of receive element 121 can cause LTE 122 to generate an alarm signal to the network management system in order to circumvent the failed fiber 116 or failed receiver 121.

The complexity of properly keeping track of data signals in an optical network after network restoration or standard network maintenance is further complicated when the network contains optical cross-connect switches interposed between LTEs. This in turn, eliminates dedicated lines existing between LTEs. An example of such a network is shown in FIG. 2.

Figure 2:
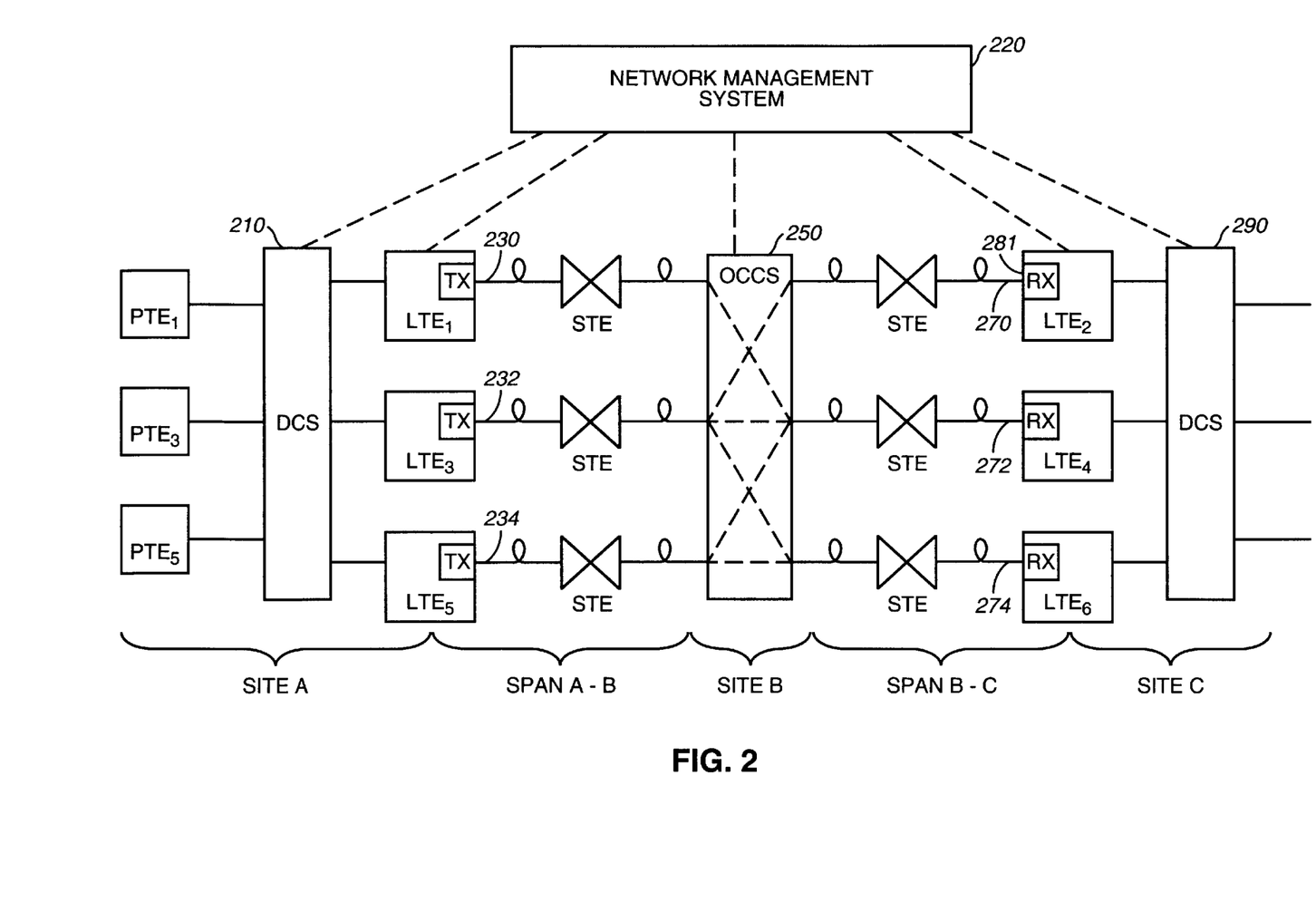
FIG. 2 illustrates a portion of an optical network showing the role of an intermediate optical cross-connect switch.

FIG. 2 is an expansion of FIG. 1 to encompass an optical cross-connect switch (OCCS) now labeled as Site B, while electrical DCSs 210,290 are provided at respective endpoint sites A,C. This figure is illustrative of the preferred approach of performing more data signal handling in the optical domain. Traffic between sites A and C thus travels through an intermediate OCCS 250 at site B. Spans A–B and B–C interconnect the sites as shown. Span A–B includes working fibers 230,232 and protect fiber 234. Span B–C includes working fibers 270,272 and protect fiber 274.

OCCS 250 is capable of being controlled in the same way as the digital cross-connects. An electrical control signal (or an optical control signal) drives the optical switch to selectively form optical connections among various input and output ports facing optical fibers 230–234, 270–274. A Network Management System 220 monitors and controls OCCS 250 and the other network elements.

While the approach of FIG. 2 is advantageous and illustrates the current trend towards implementing all-optical networks, a new problem is introduced in reliably detecting and locating failures. Without dedicated lines between LTEs, it is difficult to detect failure along fiber 230 as distinct from failure along fiber 270. In particular, LTEs located at the endpoints of optically interconnected spans cannot distinguish which span causes a communication failure. For example, if $LTE_1$ and $LTE_2$ are communicating along fibers 230 and 270 and a cut develops along fiber 230, this failure is detected by receiver 281 at site C. Without a separate detection at intermediate site B, however, the failure cannot be pinpointed to fiber 230 or fiber 270. For example, if network management system 220 receives an alarm from receiver 281 at an endpoint node, it must assume that both fibers 230 and 270 have failed.

Restorative switching on a path basis between endpoints can be performed through DCS switches 210 and 290 as discussed above. For purposes of line protection switching and restoration, this recovery scheme leaves OCCS 250 no more useful than straight permanent connections. This amounts to what is called path protect switching in that entire paths between endpoint sites are switched. The problem is exacerbated as more working and spare fibers are taken into account.

Thus, network management of data traffic is even more critical due to the increased proliferation and diversity of network elements and signals. For example, after network restoration it is important for the network service provider to know if two LTEs are in proper communication as they were before the restoration. While a LTE receiver may indicate that light is once again present on the line after network restoration, it currently cannot acknowledge or indicate to the network that it is receiving the data from the same transmitting LTE. OCCSs will reroute SONET line systems for maintenance, overbuild, and restoration purposes.

In order to avoid mis-connections and loss of service continuity, the present invention provides a method and system for ensuring that a given line is routed correctly through the network. While SONET protocol is presently designed to ensure path and section reliability by providing "Path Trace" and "Section Trace" bytes within standard SONET Transport Overhead, no such byte exists to provide the same line reliability.

3. SONET Line Trace

Figure 3:
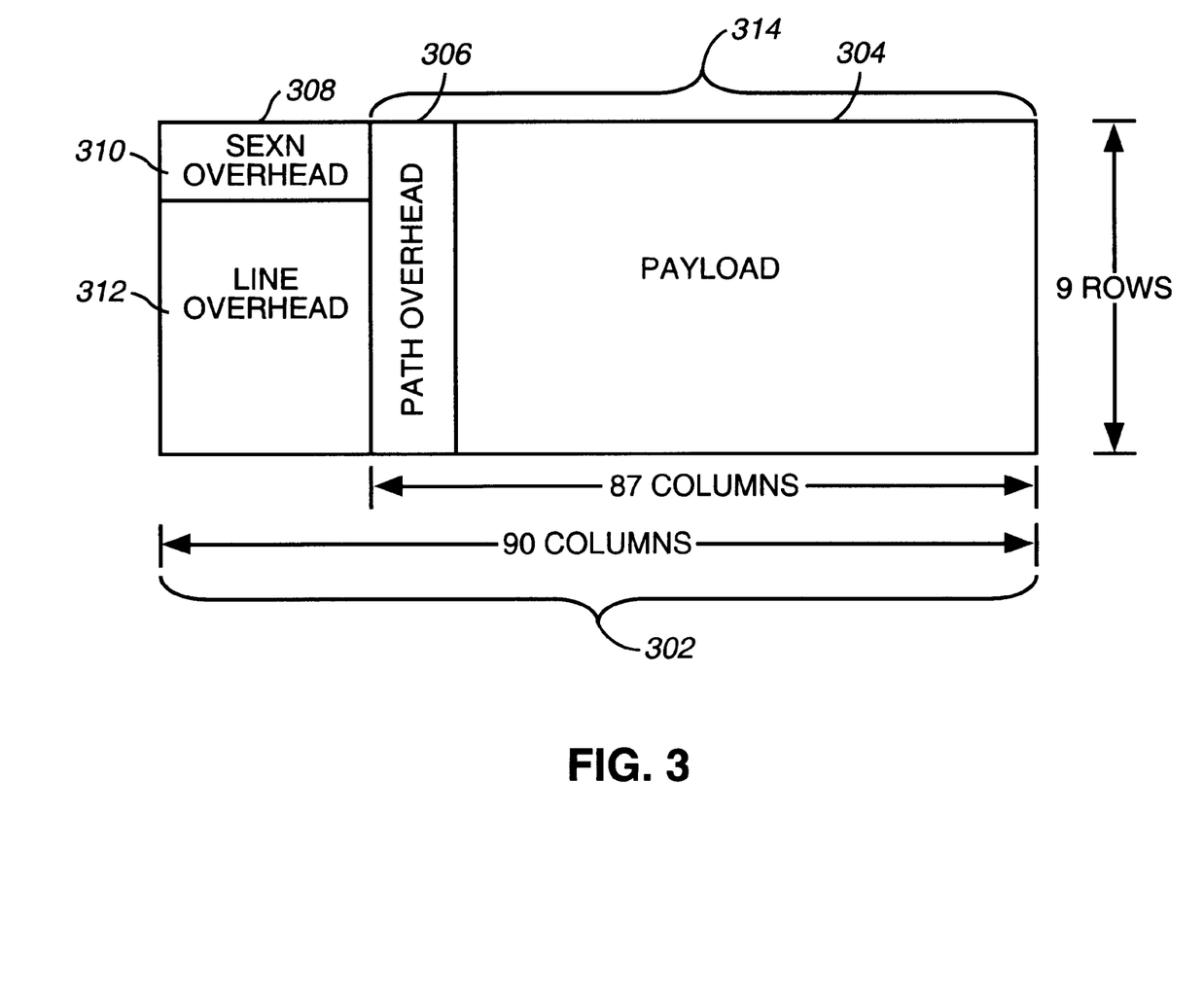
FIG. 3 illustrates a standard SONET signal frame.

FIG. 3 provides a general overview of the standard SONET signal frame 302. The frame 302 consists of nine rows by 90 columns of 8-bit bytes, such that 9×90×64 kbps (total number of bits)=51.84 Mbps. The frame 302 comprises two major elements, the STS-1 Synchronous Payload Envelope (STS-1 SPE) 314, and the Transport Overhead 308. The STS-1 Synchronous Payload Envelope 314 comprises the Payload 304 and the Path Overhead (POH) 306. SPE 314 carries the actual "payload" or end-user information being transported over the SONET facility. The POH consists of 9 bytes, and is used to communicate functions from the point at which service is mapped into the STS SPE 314 to where it is delivered, such as from $PTE_1$ to $PTE_2$ in FIG. 1. The Transport Overhead 308 comprises a Section Overhead (SOH) 310 and a Line Overhead (LOH) 312. While the Transport Overhead 308 is typically used to communicate network parameters such as alarm, maintenance, control, performance, and administrative data between SONET elements and to network management systems, the LOH 312 currently has no means for ensuring that two LTEs are properly communicating with each other.

Figure 4:
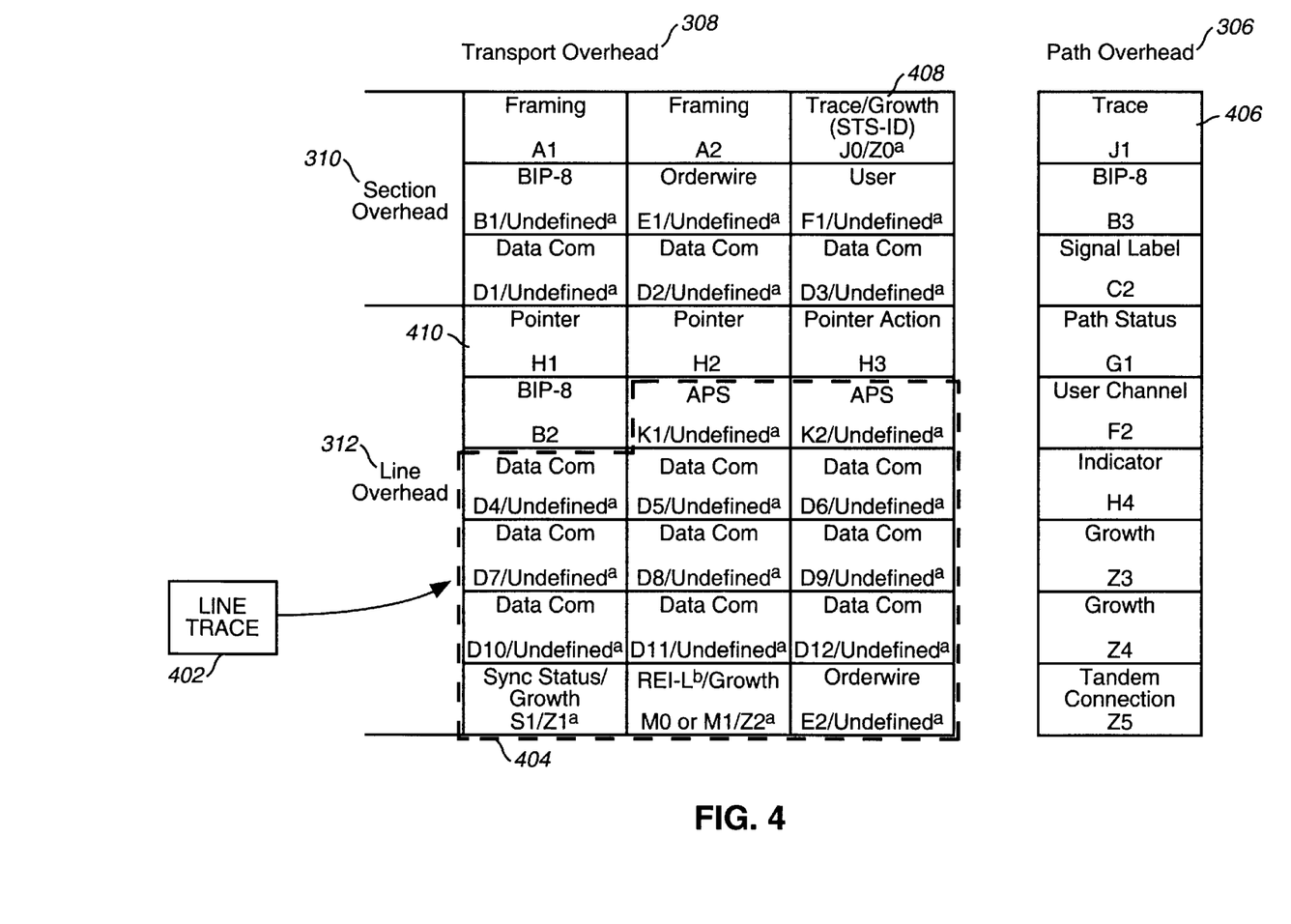
FIG. 4 is an expanded view of the Path and Transport Overhead in a SONET signal and where the Line Trace byte is inserted in a preferred embodiment of the present invention.

The present invention provides a system and method for ensuring proper communications between LTEs by placing a new byte, a "Line Trace" byte, into the LOH component of the SONET signal. FIG. 4 shows a detailed breakdown of the current bytes comprising SONET POH 306, SOH 310 and LOH 312.

Currently, the only SONET equipment capable of ensuring proper communications between themselves are PTEs and STEs. For example, POH 306 currently comprises, as one of its nine bytes, a "Trace/J1" byte 406. This byte provides "Path Trace" between SONET path equipment. Path Trace is used to transmit a 64 byte, fixed length string, repetitively so that a Path receiving terminal (e.g. $PTE_2$) can verify its continued connection to the intended transmitter (e.g. $PTE_1$). In other words, Path Trace enables a network provider to identify mis-connections between any two PTEs in the network. Similarly, SOH 310 currently includes a "Trace/Growth (STS-ID) J0/Z0" byte 408, providing "Section Trace" that enables a network provider to identify mis-connections between any two STEs (e.g. lightwave regenerators 120a and 120b, from FIG. 1) in the network.

Presently, SONET LOH 312 contains some important network indicators. For example, the "Pointer/H1" and "H2" bytes are a payload pointer that designates the location of the byte where the STS-1 SPE begins. It is used to align the STS-1 Transport Overhead in an STS-N signal. However, no current byte in LOH 312 provides the same functionality as the Trace bytes 406 and 408 from POH 306 and SOH 310, respectively.

In the present invention, a "Line Trace" byte 402, would be inserted into the LOH 312 of the Transport Overhead 308. Line Trace 402 would thus enable a network provider to identify mis-connections between any two LTEs (e.g. $LTE_1$ and $LTh_2$ from FIG. 2) in the network. The Line Trace byte 402 could be placed anywhere in the dashed-line region 404 of LOH 312 where there are currently bytes designated as "undefined."

LTEs used to be considered as static equipment, with dedicated lines connecting transmitters and receivers. As a result, Line Overhead did not incorporate any "Trace" functionality. However, with the increasing use of OCCSs, it is essential for a network service provider to have the flexibility to move LTEs around via the OCCSs. Thus, the present invention offers a straightforward, efficient way to achieve this necessary flexibility.

Line Trace 402 can be very useful to a network provider for the restoration situations discussed above in the Example Environment section. Recall that restoration situations arise in response to a failure in communication between network elements. This communications failure may result, for example, from a cut in an optical fiber, a faulty optical amplifier or regenerator, or a faulty OCCS located at a particular node. As shown in FIG. 1, in the past, lines were dedicated between LTEs. Thus, if communications ceased between $LTE_1$ and $LTE_2$, once the line was restored, $LTE_1$ was guaranteed to be in communication with $LTE_2$, since there was no other LTE that could be linked to $LTE_2$.

As shown in FIG. 2, with the introduction of OCCSs to the network, a network provider can now take the same LTE and use it for both a working path and a restoration path. This adds overall flexibility to the network in the event of a communications link failure. However, by introducing an OCCS placed between $LTE_1$ and $LTE_2$, as well as by increasing number of other STEs interposed between LTEs, other problems may arise.

For example, assume a network failure halts communications between $LTE_1$ and $LTE_2$, where $LTE_2$ was receiving a SONET signal from $LTE_1$ before the network failure. The network management system is alerted that $LTE_2$ is no longer detecting light. As a result, the network management system would initiate a restoration technique, such as re-routing traffic around a faulty network node. After the restoration is performed, $LTE_2$ begins detecting light again. However, presently there is no way of confirming that the SONET signal $LTE_2$ is receiving is the proper SONET signal from $LTE_1$. In other words, the network restoration may not be completely successful: $LTE_2$ may be receiving a signal from $LTE_3$ instead of $LTE_1$ after restoration.

With the present invention, the advantage created by Line Trace is that it provides network management with the capability to detect this potential mis-connection. For example, in a complex optical network environment consisting of many nodes and links, a typical restoration technique may involve the re-routing of multiple signals throughout the network to avoid a faulty OCCS. With the present invention, Line Trace functionality will enable network providers to perform many options in a case of improper communications after a network restoration. In addition, since LTEs often comprise both signal transmitters and signal receivers, Line Trace can be utilized to identify both LTE mis-connections and loop-backs at either end or along the communications link. In other words, Line Trace can also ensure that a given LTE is not looking at itself.

In one scenario, for example, in the event of a network communications failure, restoration may be provided by re-routing signals from a first optical transmission line through the OCCS to a second optical transmission line. Optical communication between $LTE_1$ and $LTE_2$ is then fully restored when the Line Trace byte is acknowledged by $LTE_2$. In another scenario, if a receiving $LTE_2$ is no longer detecting the particular Line Trace byte in the SONET signal (indicating communication with $LTE_1$) after a network restoration event, this lack of proper Line Trace could trigger a warning to the network management system, a major or minor alarm, or all traffic could be squelched. For example, if the message received by $LTE_2$ was not properly provisioned, an Alarm Indicating Signal (AIS) could be inserted down stream to indicate a mis-connection.

In one embodiment of the present invention, Line Trace may be implemented by a service provider in an optical communications network as follows. Within the network, all equipment has a card or place inside its architecture that handles SOH and LOH. As shown above, the format of how this Transport Overhead is structured is part of SONET. At a point where a service provider or user, for example, is building its protocol, the Line Trace byte may be added onto the LOH 312. In other words, with SONET, a user has the capability to provision in the information to identify a LTE.

Another advantage of the present invention is that this Line Trace functionality may be added through software because the SONET compatible hardware already provides a user with the capability to read and write from that Transport Overhead byte. With the present invention, these capabilities include a user's ability to disable Line Trace or enable Line Trace. Once enabled, the Transport Overhead may be further provisioned with shelf identification or shelf serial number, that acts as a unique identifier. As also shown in FIG. 4, SONET has other user space that enables the user to program in site identification, wavelength, destination, circuit identification, etc. The user may program this information into the Transport Overhead either at the sender or receiver end.

In one case, for example, the receiver LTE would recognize data sent by a transmitting LTE and would accept the signal by acknowledging it. This acknowledgment may involve sending an acknowledgment signal either back to the transmitting LTE or to the network management system in order to confirm that the data sent by the transmitting LTE to the receiver LTE has been properly received. In another case, the receiver LTE would accept the data until told differently by another overhead byte.

A major advantage of the added functionality of the present invention from a network service provider's standpoint, is that the shelf processor on the network management system level can then monitor and control this network activity. Additionally, a SONET device also has a shelf processor that controls all that same functionality for the SOH, for example. Thus the present invention would just be one more activity that a SONET device is performing. The advantage of using SONET protocol is that all the intelligence is already there.

In addition, having the added Line Trace functionality will allow a network service provider control and access to data being communicated along a network, without affecting user-controlled paths. Currently, many paths may be located on the same line. For example, OC-192 has 192 paths on each line. The SONET equipment creates the path, wherein each path could be provisioned differently, with different users controlling each path. Several different PTEs could be sending data through $LTE_1$ at any point in time. Currently, if a problem occurs so that the paths are cut off from each other, some PTEs that were communicating to each other via $LTE_1$ and $LTE_2$ would not be assured of proper communication to each other after a network restoration without Line Trace. In other words, nothing presently implemented in a SONET network ensures that after restoration, $LTE_1$ will be communicating with $LTE_2$. With the present invention, Line Trace will enable a network provider to confirm that $LTE_1$ is again talking to $LTE_2$ as it was before the communications failure. Without Line Trace, a network service provider could only assume $LTE_1$ is talking with $LTE_2$. Thus, by adding Line Trace, a service provider would know $LTE_1$ is uniquely identified so that after network restoration, $LTE_1$ is still communicating with $LTE_2$ on the other end. Further, Line Trace can alert the network management system to the presence of a mis-connect so that it could perform a restoration again.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

4. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of ensuring proper communications between two sites in a communications network, wherein the communications network includes a first site having a first Line Terminating Equipment ($LTE_1$) capable of transmitting a SONET optical data signal in optical communication with a second site comprising a second Line Terminating Equipment ($LTE_2$) capable of receiving a SONET optical data signal, and a plurality of Section Terminating Equipment located between the first and second sites, the method comprising the steps of:

(a) generating a SONET optical data signal at $LTE_1$ comprising a Line Trace byte embedded in a Line Overhead Component of said SONET optical data signal, wherein a user may enable or disable said Line Trace byte;

(b) transmitting said SONET optical data signal along a first optical transmission line;

(c) receiving said SONET optical data signal at $LTE_2$, wherein $LTE_2$ is capable of detecting said Line Trace byte;

(d) acknowledging a presence of said Line Trace byte in said SONET optical data signal received at $LTE_2$; and (e) alerting a network management system if said proper Line Trace byte is not received at $LTE_2$.

2. The method of claim 1, wherein the communications network further comprises at least one optical cross-connect switch (OCCS) located between the first site and the second site, wherein the method further comprises the steps of:

(f) determining if said first optical transmission line connecting the first site with the second site has failed; and (g) re-routing signals from said first optical transmission line through said OCCS to a second optical transmission line, wherein optical communication between $LTE_1$ and $LTE_2$ is restored if said Line Trace byte is acknowledged by $LTE_2$.

3. The method of claim 2, wherein said first Line Terminating Equipment ($LTE_1$) is further capable of receiving a SONET optical data signal and said second Line Terminating Equipment ($LTE_2$) is further capable of transmitting a SONET optical data signal, wherein the method further comprises the step of:

(h) alerting said network management system if a loopback condition occurs at either end or along the communications link.

4. The method of claim 1, wherein step (a) further comprises the step of:

programming said Line Trace byte onto said Line Overhead component of said SONET optical data signal at the first site via software, wherein said Line Trace byte may be located in an undefined portion of said Line Overhead of said SONET optical data signal.

5. An optical communications network, wherein data is communicated between a first site and a second site, comprising:

a first Path Terminating Equipment device located at the first site;

a second Path Terminating Equipment device located at the second site;

a plurality of optical fibers linking the first site and the second site;

a first Line Terminating Equipment ($LTE_1$) capable of transmitting a SONET optical data signal and in communication with the first site, wherein said SONET optical data signal comprises a Line Trace byte located in a Line Overhead component of said SONET optical data signal, and wherein said Line Trace byte may be enabled or disabled by a user;

a second Line Terminating Equipment ($LTE_2$) capable of receiving said SONET optical data signal and in communication with the second site, wherein said $LTE_2$ is capable of acknowledging said Line Trace byte;

a plurality of Section Terminating Equipment, located along said optical fibers between the first and second sites, wherein said plurality of Section Terminating Equipment includes at least one optical cross-connect switch; and a network management system coupled to said $LTE_1$, said $LTE_2$, and said Section Terminating Equipment, capable of monitoring and controlling communications in the network.

6. The network of claim 5, wherein said network management system restores proper communication between said first Line Terminating Equipment and said second Line Terminating Equipment if communications fail, wherein said Line Trace byte alerts said Line Terminating Equipment and said network management system if proper communication between said $LTE_1$ and said $LTE_2$ is not restored.

7. The network of claim 5, wherein said first Line Terminating Equipment ($LTE_1$) is further capable of receiving said SONET optical data signal and said second Line Terminating Equipment ($LTE_2$) is further capable of transmitting a SONET optical data signal, wherein said $LTE_1$ is capable of acknowledging said Line Trace byte, and wherein said Line Trace byte alerts said Line Terminating Equipment and said network management system if a loop-back condition occurs at either LTE or along the communications link.

8. The network of claim 5, wherein said Line Trace byte may be located in an undefined portion of said Line Overhead of said SONET optical data signal.

9. The network of claim 5, further comprising:

software means for programming said Line Trace byte into said Line Overhead of said SONET signal at said $LTE_1$, wherein said network management system monitors a presence of said Line Trace byte in said SONET optical data signal.

10. A SONET signal, to provide high rate data transfer between a first site comprising a first Line Terminating Equipment device ($LTE_1$) and a second site comprising a second Line Terminating Equipment device ($LTE_2$) in a communications network, wherein $LTE_1$ is capable of transmitting the SONET signal and $LTE_2$ is capable of receiving the SONET signal, wherein $LTE_1$ and $LTE_2$ are in optical communication along an optical transmission line, and wherein a plurality of Section Terminating Equipment are located between the first and second sites along the transmission line, comprising:

a Payload portion, comprising a plurality of bytes of data entered by a user at the first site;

a Path Overhead portion, comprising a plurality of bytes of data indicating a path linking the first and second sites and network parameters monitored by a network management system, wherein said plurality of Path Overhead bytes further comprises a Path Trace byte, indicating proper communications between Path Terminating Equipment;

a Section Overhead portion, comprising a plurality of bytes of data indicating further network parameters monitored by said network management system, wherein said plurality of Section Overhead bytes further comprises a Section Trace byte, indicating proper communications between Section Terminating Equipment; and a Line Overhead portion, comprising a plurality of bytes of data indicating further network parameters monitored by said network management system and the Line Terminating Equipment, wherein said plurality of Line Overhead bytes further comprises a Line Trace byte, indicating proper communications between $LTE_1$ and $LTE_2$, and wherein said Line Trace byte may be enabled or disabled by a user.

11. The SONET signal of claim 10, wherein said Line Trace byte may be located in any undefined portion of said Line Overhead of the SONET signal.

* * * * *